June 4, 1935.  H. W. BALDWIN  2,003,730
FLUME
Filed Nov. 13, 1934
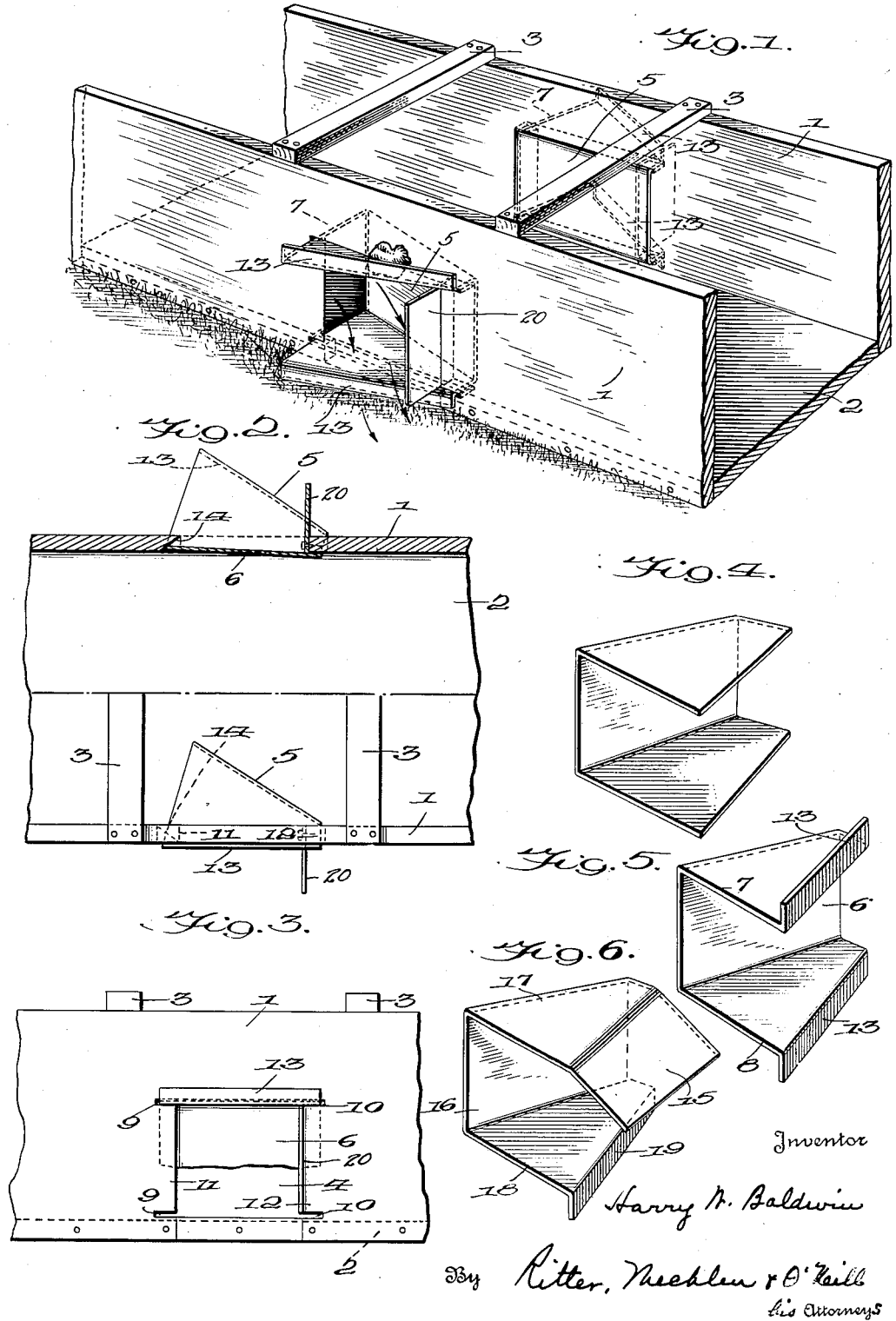

Patented June 4, 1935

2,003,730

UNITED STATES PATENT OFFICE 2,003,730

FLUME

Harry W. Baldwin, Hamakuapoko,
Territory of Hawaii

Application November 13, 1934, Serial No. 752,878

10 Claims. (Cl. 61—14)

My invention relates to flumes and to a method of constructing the same and it has for its principal object the provision of simple and efficient means which may be easily associated with a flume for controlling the discharge of water therefrom.

A primary feature of the invention consists in providing the flume with a gate having spaced portions cooperable with opposite sides of the flume side wall affording means for rotatably associating the gate with the side wall.

Another feature of the invention consists in providing the flume with a rotatable gate having a main body portion adapted to overlap the inner face of the side wall of the flume, when the gate is closed, and having portions adapted to overlap the outer face of the side wall, when the gate is open, to limit opening rotation of the gate.

Still another feature of the invention consists in providing the flume with a rotatable gate having portions substantially normal to the side wall of the flume for cooperating with the latter to serve as guides during rotation of the gate.

A further feature of the invention consists in the simple manner of associating the rotatable gate with the flume, which involves placing the gate in the opening in the side wall of the flume and subsequently deforming portions thereof to maintain the gate in pivotal association with the flume.

Other and more specific features of the invention, residing in advantageous forms, combinations and relations of parts, will hereinafter appear and be pointed out in the claims.

In the drawing:

Figure 1 is a fragmentary perspective view of the flume showing one gate in partially open position and showing another gate in closed position.

Figure 2 is a view one-half in plan and one-half in section of a portion of the flume showing one gate in open position and another in closed position.

Figure 3 is a side elevation of a portion of the flume adjacent one of the outlet openings, a portion of the gate being broken away.

Figure 4 is a detail perspective view of the gate before being associated with the flume.

Figure 5 is a detail perspective view of the completely formed gate.

Figure 6 is a detail perspective view, similar to Figure 5, showing a somewhat modified form of gate.

While the drawing only shows a portion of the flume, those skilled in the art will understand that it may be of any desired length. Moreover, the flume may be provided with any number of discharge openings and, while those on one side of the flume may be in staggered relation with those on the opposite side, it may be preferable to arrange them opposite each other, as shown in the drawing.

Referring more particularly to the drawing, a flume of substantially channel or U-shape in cross section has been chosen for illustrating the invention, the side walls thereof being indicated by the reference numeral 1 and the bottom by the numeral 2. If desired, the side walls may be rigidly connected at their upper edges by transverse braces 3. The side walls are provided with openings 4 of preferably rectangular shape through which water discharges into an irrigating furrow.

Associated with each of the openings is a rotatable gate 5 for controlling the discharge of water. Each gate has a main body portion 6 provided adjacent its upper and lower edges with outwardly extending plate-like portions 7 and 8, which respectively project through slots 9 and 10 communicating with the corners of the opening at opposite sides thereof. The slots 9 define a portion 11 and the slots 10 define a portion 12, the inner faces of which are adapted to be respectively overlapped by the main body portion 6 of the gate. The plate portions 7 and 8 preferably progressively decrease in width from adjacent one end to the other and each terminates in a flange 13 which converges with respect to the main body portion of the gate toward one of the side edges thereof and is adapted to overlap the adjacent outer face of the side wall of the flume. At the edge of the gate toward which the flanges 13 and main body portion 6 converge, these elements are disposed closely adjacent opposite sides of the cooperating side wall of the flume. By this construction, it will be perceived that this edge of the gate is prevented from shifting laterally, but, since the main body portion and flanges diverge therefrom, the gate may be rotated through an angle substantially corresponding to the angle defined by the flanges and main body portion.

As will be readily understood, the gate is rotatably mounted at the down-stream edge of the opening. When in closed position, the main body portion 6 of the gate is in overlapping engagement with the inner faces of the portions 11 and 12 at the side edges of the opening. The portion 11 at the up-stream edge of the opening may be inclined, as at 14, so that, when the gate is closed, its free edge may be disposed slightly inwardly of the inner face of the adjacent side wall, thereby materially reducing the tendency of the water flowing down the flume to force the gate open and also minimizing the unintentional escape of water from the flume. When the gate is moved toward open position, the main body portion thereof is moved into the flume and in any position of adjustment it may assume, it will extend at an angle to the direction of flow of the water, so as to direct the water toward the opening, from which it discharges after being further deflected by the edge of the portion 12, which is disposed substantially perpendicular to the normal direction of flow of the water within the flume. Thus, water passing through the discharge opening will not issue therefrom at such an acute angle as to wash away the bank of the furrow into which the water discharges. If desired, an outwardly projecting plate 20 or the like may be mounted adjacent the downstream side of each opening to further deflect the water.

Movement of the gate inwardly into open position is arrested by the flanges 13 engaging the outer face of the adjacent side of the flume. The gate may be easily maintained in any intermediate position between fully opened and fully closed by inserting a stick, stone or other convenient object between the upper end of the flanges 13 and the neighboring side wall of the flume. Such an object may be supported on the upper plate portion 7.

The plate portions 7 and 8 by passing through slots 9 and 10 guide the gate during opening and closing movements. These portions also serve to prevent longitudinal movement of the gate, that is movement of the gate lengthwise of the flume, by cooperating with the end portions of the slots.

Instead of providing the upper plate portion 7 with an upwardly extending flange, as previously described, it may be desirable, under some circumstances, especially in cases where the water flows in the flume at a relatively high velocity, to provide it with a downwardly extending flange 15, as illustrated in Figure 6. A flange of this character will deflect the water downwardly, as it issues from the opening into the lower portion of the water receiving furrow, where, notwithstanding its velocity, it will do little harm. Except for the flange 15, the gate illustrated in Figure 6 is of substantially the same shape and form as the gate heretofore described. Thus, it has a main body portion 16 and upper and lower plate portions 17 and 18, respectively, the latter of which terminates in a downwardly extending flange 19 for overlapping the outer face of the adjacent side of the flume to limit opening movement of the gate.

The gates 5 may be formed from metal blanks which, preparatory to being assembled with the flume, are bent into the shape shown in Figure 4. When thus formed, the gate is placed within the flume with its upper and lower plate-like portions projecting toward the side of the flume with which it is to be assembled. The plate portions are then inserted within the slots 9 and 10 and the gate is caused to assume any convenient position preferably a one corresponding to fully open position, so that the outer edge of the plate portions may be bent to form the flanges 13. Upon the completion of this operation, the gate will be pivotally associated with the flume and this it will be observed is accomplished without the aid of pivot pins, hinges or the like.

The gate illustrated in Figure 6 is associated with the flume in the same manner as gate 5, with the exception, of course, that, instead of bending the upper plate portion upwardly to form the flange 13, it is bent downwardly to form the flange 19. As shown in Figure 6, the flange 19 is somewhat longer than flange 13 and this is accomplished, in the first instance, by making the upper plate portion of the blank from which the gate of Figure 6 is made longer than the upper plate portion of the blank from which gate 5 is made.

From the foregoing, it will be perceived that a simple, rugged and efficient means has been devised for controlling the discharge of water from flumes and the like. It will, moreover, be perceived that the control means may be easily assembled with the flume without the aid of additional connecting means.

What I claim is:

1. A flume having a side wall with an opening therein and a rotatable gate for closing said opening, said gate being rigidly provided adjacent one edge thereof with portions respectively overlapping opposite sides of said wall affording means pivotally associating the gate with the wall.

2. A flume having a side wall provided with an opening, a rotatable gate for closing said opening, said gate including a main body portion provided with a portion adapted to overlap the inner side of said wall and an outwardly spaced portion extending at an angle to the main body portion adapted to overlap the outer side of said wall, said portion of the main body portion and outwardly spaced portion being disposed closely adjacent opposite sides of the wall at one edge of the gate to afford means rotatably associating the gate with the flume.

3. A flume having a side wall with an opening therein, and a rotatable gate for closing said opening, said gate including a main body portion provided with a portion adapted to overlap the inner face of said side wall to limit movement of the gate in a closing direction and a portion spaced laterally from said portion of the main body portion adapted to overlap the outer face of the side wall for limiting movement of the gate in an opening direction.

4. A flume having a side wall provided with an opening, and a rotatable gate for closing said opening, said gate including a main body portion disposed within the flume and plate-like portions extending outwardly of the flume, one of said plate-like portions being provided with means adapted to overlap the outer face of the side wall to limit opening movement of the gate.

5. A flume having a side wall provided with an opening, and a rotatable gate for closing said opening, said gate including a main body portion adapted to overlap a portion of the inner face of said side wall adjacent the opening, and plate portions projecting outwardly through said opening from adjacent the upper and lower edges of the main body portion, one of said plate portions being integrally provided with an offset portion adapted to overlap a portion of the outer face of said wall adjacent the opening to limit opening movement of the gate.

6. A flume having a side wall provided with an opening, said wall having slots communicating with the opening adjacent the upper and lower edges thereof, and a rotatable gate associated with said openings, said gate having a main body portion normally disposed within the flume and plate-like portions disposed within said slots and extending exteriorly of the flume, one of said plate portions having means adapted to overlap an adjacent portion of the outer face of the side wall to limit opening movement of the gate.

7. A flume having a side wall provided with an opening, and a rotatable gate for closing the opening, said gate including a main body portion movable inwardly into the flume for deflecting water through the opening, and a plate-like portion extending substantially normal to said main body portion and terminating in a flange adapted to overlap the outer side of said wall for limiting inward movement of said body portion, said body portion and flange converging toward one edge of the gate and cooperating with opposite sides of the wall to provide means pivotally connecting the gate therewith.

8. A flume having a side wall provided with a discharge opening, a gate rotatably associated with the side wall for closing the opening, said gate including a main body portion movable into the flume for directing water to said opening, and plate-like portions extending through said opening from adjacent the upper and lower edges of said main body portion, the upper one of said plate portions being provided with a downwardly extending portion for deflecting downwardly water issuing from the opening and the lower one of said plate portions being provided with means adapted to overlap the outer side of said wall for limiting inward movement of said main body portion.

9. The method of pivotally associating a gate with a discharge opening in the side wall of a flume which consists in placing a gate having a main body portion and plate-like portions projecting therefrom adjacent its upper and lower edges within the flume with said plate-like portions extending toward the side wall of the flume, inserting said plate-like portions within said opening to cause them to project therethrough, and bending the projecting end of one of said plate portions to provide a flange adapted to overlap the outer side of said wall.

10. A flume having a side wall provided with an opening, and a rotatable gate for closing the opening, said gate including a main body portion movable inwardly into the flume for deflecting water through the opening and a portion spaced outwardly from and converging with respect to the main body portion adapted to overlappingly cooperate with the outer face of the flume for limiting inward movement of said main body portion.

HARRY W. BALDWIN.